D. MACDONALD.
MOTOR VEHICLE.
APPLICATION FILED APR. 28, 1920.
1,428,550.
Patented Sept. 12, 1922.
2 SHEETS—SHEET 1.
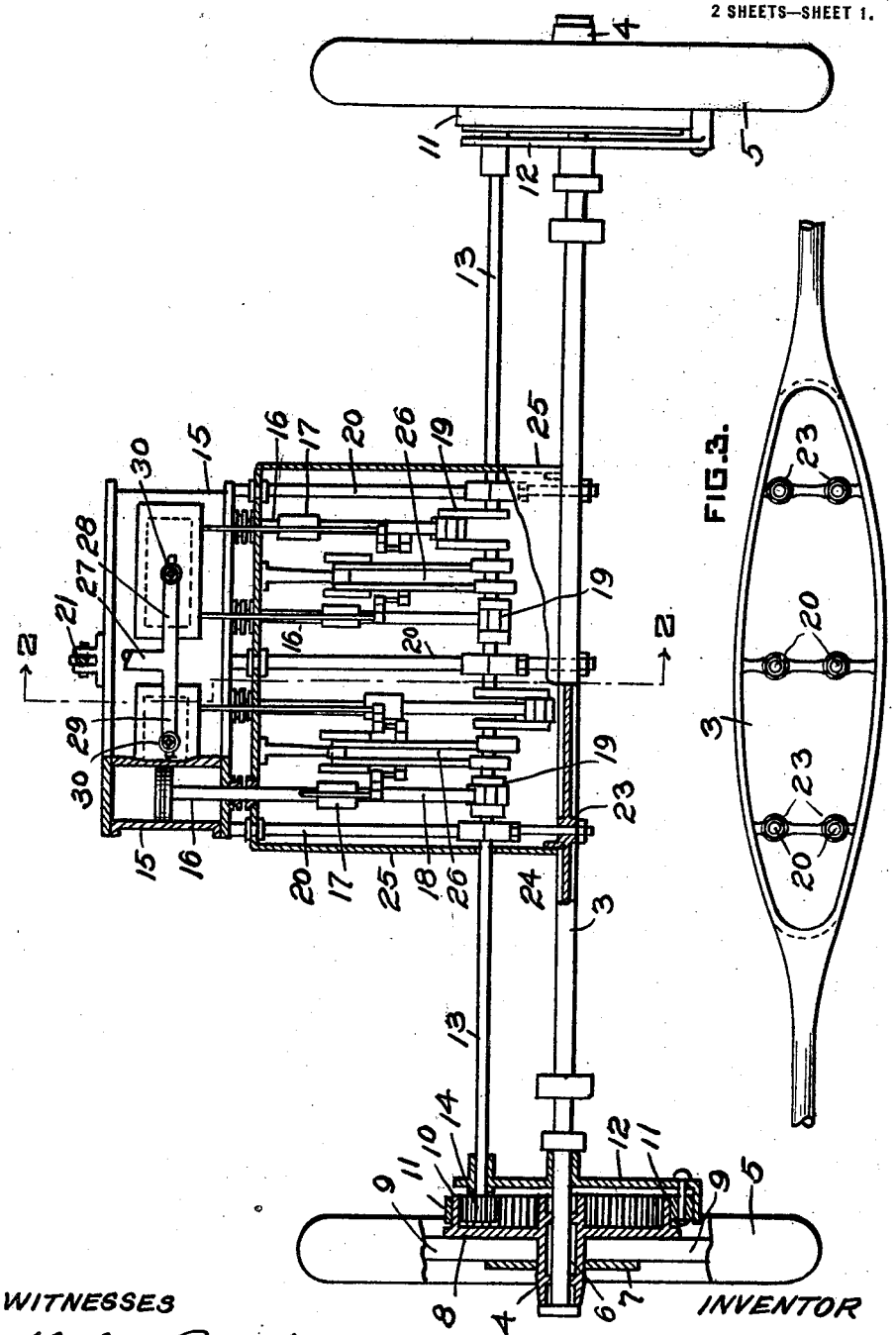
WITNESSES
J. Herbert Bradley.
INVENTOR
Duncan Macdonald
By Green and McCallister,
his attys.

D. MACDONALD.
MOTOR VEHICLE.
APPLICATION FILED APR. 28, 1920.
1,428,550.
Patented Sept. 12, 1922.
2 SHEETS—SHEET 2.
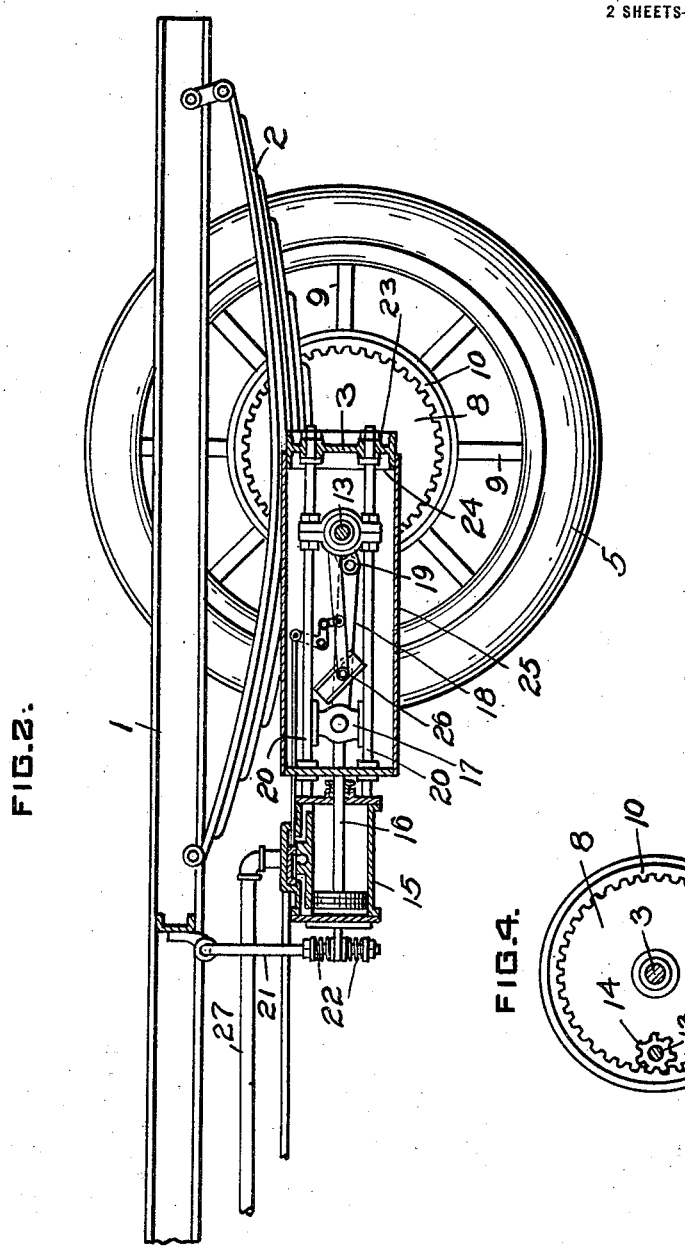
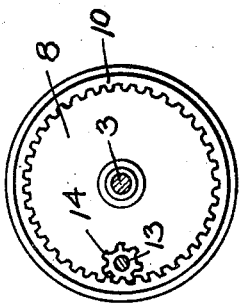
WITNESSES
J. Herbert Bradley
INVENTOR
Duncan Macdonald
By Green and McCallister
His Attys.

Patented Sept. 12, 1922.

1,428,550

UNITED STATES PATENT OFFICE.

DUNCAN MACDONALD, OF PITTSBURGH, PENNSYLVANIA.

MOTOR VEHICLE.

Application filed April 28, 1920. Serial No. 377,183.

*To all whom it may concern:*

Be it known that I, DUNCAN MACDONALD, a citizen of the United States, and a resident of Pittsburgh, in the county of Allegheny and State of Pennsylvania, have made a new and useful Invention in Motor Vehicles, of which the following is a specification.

My invention relates to motor vehicles and consists in an improved driving mechanism for the traction wheels. It is best adapted for tractors, trucks or other heavy duty vehicles and involves an application of the mechanism shown and described in Patent No. 1,314,528 issued to me September 2, 1919.

The object of my invention is to provide a steam driven, propelling plant which is simple and efficient in itself and in its assembly with the vehicle which it operates.

In the accompanying drawings, Figure 1 is a plan and horizontal section of my driving unit assembled with the traction wheels of a vehicle; Fig. 2 is a vertical, longitudinal section on line 2—2 of Fig. 1; Fig. 3 is a partial elevation of the rear axle of the vehicle, and Fig. 4 is an elevation of internal gear and pinion through which the traction wheels are driven.

The vehicle frame 1 is supported on springs 2 mounted on a forged I shaped section axle 3. Each end of axle 3 is reduced and forms a cylindrical journal for the hub 4 of a vehicle wheel 5 and the hub is recessed at 6 for roller bearings of the usual type. Each hub 4 has spaced flanges 7 and 8 which provide sockets between them for the wheel spokes 9. Flange 8 is provdied with an annular rim 10 and spur teeth are cut on the interior of this rim. The rim exterior serves as a brake drum for the band brake 11 one end of which is secured to a gear enclosing member 12. Member 12 is rigidly mounted on axle 3 and serves as a spacing and journaling member for the outer end of a jack shaft 13 which drives the traction wheel through a pinion 14 meshing with the internal gear on rim 10.

I utilize a steam driven engine and the cylinders are preferably four in number, cast en bloc and are shown at 15. Cylinder unit 15 is located some distance in front of axle 3 and piston rods 16 extend to the rear of the cylinders to cross heads 17 from which the connecting rods 18 extend to the engine crank shaft pins 19. The crank shaft pins are offset portions of the inner ends of jack shafts 13.

Cylinder unit 15 is rigidly spaced and supported from axle 3 by rods 20. The forward end of unit 15 is supported from frame 1 by a hanger 21. I prefer to provide a flexible connection between member 15 and hanger 21 and in Fig. 2 such a connection is shown in coiled springs 22.

It will be noted that the power plant is flexibly mounted on the vehicle by the spring connected, swinging hanger 21 which cooperates with wheels 5 to provide the driving mechanism with a three point support.

The central portion of axle 3 is illustrated in Fig. 3. The depth of the I section is increased to accommodate the vertical spacing of rods 20 and is provided with bosses 23 at the points of attachment of the rods. The front of axle 3 has an integral, preferably oval flange 24 to which is secured the rear end of a housing 25 which extends forwardly to a point near unit 15 and terminates in an integral or built up wall provided with stuffing boxes for the reciprocal action of piston rods 16. Housing 23 encloses crossheads 17, connecting rods 18, crank pins 19 and the valve gear 26 and forms an oil case for a splash system of lubrication for these parts. It also assists rods 20 in forming an integral cylinder spacing and supporting structure.

It will be noted that the combined jack shafts and crank shafts for the opposite traction wheels are unconnected but have a common bearing at their inner ends. Each is free to turn independently of the other and the usual differential mechanism is eliminated by the common steam supply to the four cylinders. Greater resistance of one traction wheel to its drive opposes the movement of its respective pistons in cylinder unit 15 and a greater quantity of steam is diverted to the cylinders which drive the opposite traction wheel which increases the speed of the latter.

This distribution of the steam corresponds to the distribution of driving shaft torque in the usual gear and pinion differential without the original and maintenance cost of same. Steam is supplied to the cylinders through line 27 which branches into pipes 28 and 29 for the right and left hand pairs of the cylinders, respectively. Each pipe 28 and 29 is provided with a valve 30 by which the corresponding cylinders may be cut out of the driving mechanism and all of the power diverted to a single wheel. This might be desirable in cases of miring or other traction difficulty or in case of failure of some of the mechanism on one set of drivers.

I realize the many variations of the particular form and arrangement of the parts shown and described herein and contemplate the usual departures from the precise showing made in the commercial development of my invention.

I claim:—

1. In a motor vehicle, a load-supporting axle provided with a centrally arranged webbed portion, a pair of driving wheels rotatably mounted on the opposite ends of said axle, a ring gear mounted concentrically on the inner side of each driving wheel, a pair of alined driving axles journaled in parallelism with said load-supporting axle and having their adjacent ends provided with crank portions, pinions mounted on the outer ends of said axles and in mesh with said ring gears, a multiple cylinder reciprocating engine, a series of T rods supportingly connecting the engine to the load-supporting axle and operative connections between the pistons of said engine and said driving axles whereby power is applied to said driving wheels.

2. In a motor vehicle, a load-supporting axle, a pair of driving wheels rotatably mounted on the opposite ends of said axle, a ring gear concentrically mounted on the inner side of each driving wheel, bearings carried by said load-supporting axle, a pair of alined driving-axles journaled in said bearings and in parallelism with said load-supporting axle, the adjacent ends of said driving-axles being provided with crank portions, pinions on the outer ends of said driving axles, and an engine arranged to the same side of the load-supporting axle as the aligned driving axles and operatively connected with the crank portions of said driving axles.

3. In a motor vehicle, a load-supporting axle, a multiple cylinder reciprocating engine rigidly held in spaced relation to one side of the load supporting axle and having its forward end suspended from the frame of the vehicle, a housing interposed between the engine cylinders and the forward face of the load-supporting axle, driving wheels rotatably mounted on the ends of said load-supporting axle, a ring gear concentrically mounted on the inner side of each wheel, a pair of alined driving axles journaled in parallelism with said load-supporting axle, the adjacent ends of said driving axles extending into said housing and being therein provided with crank portions, pinions on the outer ends of said driving-axles meshing with said ring gears, and connecting rods within said housing coupling the pistons of said engine with the crank portions of said driving-axles.

4. In a motor vehicle, a load-supporting axle provided with a central webbed portion having a flange extending forwardly therefrom, a multiple cylinder reciprocating engine rigidly held in spaced relation to one side of the load-supporting axle, a housing extending from the engine to the webbed portion of the load supporting axle and resting on the flange extending therefrom, driving wheels mounted on the opposite ends of the load-supporting axle and an operative connection extending through the housing from the engine to the wheels for applying power to said wheels.

5. In a motor vehicle, a load-supporting axle having a medially arranged vertical extending web portion, driving wheels rotatably mounted on the opposite ends of said axle, a multiple cylinder reciprocating engine, a plurality of tie rods rigidly extending from the web portion of the axle and connected at their outer ends to the frame of the engine for supporting said engine in spaced relation to said axle, a pair of aligned driving axles journaled in parallelism with said load-supporting axle and having their inner adjacent ends provided with crank portions, a drive connection between the outer ends of the driving axles and the wheels, and an operative connection between the engine and the cranks on the driving axles whereby power is applied to said driving wheels.

In testimony whereof, I have hereunto subscribed my name, this 14th day of April, 1920.

DUNCAN MACDONALD.

Certificate of Correction.

It is hereby certified that in Letters Patent No. 1,428,550, granted September 12, 1922, upon the application of Duncan Macdonald, of Pittsburgh, Pennsylvania, for an improvement in "Motor Vehicles," an error appears in the printed specification requiring correction as follows: Page 2, line 23, claim 1, for "T rods" read *tie rods;* and that the said Letters Patent should be read with this correction therein that the same may conform to the record of the case in the Patent Office.

Signed and sealed this 7th day of November, A. D., 1922.

[SEAL.]

KARL FENNING,

*Acting Commissioner of Patents.*